United States Patent

[11] 3,576,237

[72] Inventor Robert J. Dubuc
 South Bend, Ind.
[21] Appl. No. 799,821
[22] Filed Feb. 17, 1969
[45] Patented Apr. 27, 1971
[73] Assignee The Bendix Corporation

[54] BRAKE BACKING PLATE
 3 Claims, 5 Drawing Figs.
[52] U.S. Cl. .................................................. 188/206,
 188/78
[51] Int. Cl. .................................................... F16d 65/02
[50] Field of Search ........................................ 188/78 (A),
 79.5 (SC), 79.5 (SD), 206, 206 (A)

[56] References Cited
 UNITED STATES PATENTS
 1,860,959 5/1932 Schnell ........................ 188/206(A)UX
 2,319,583 5/1943 Chambers .................... 188/79.5(SO)X
 2,741,335 4/1956 Brooks ........................ 188/206(A)X
 3,232,391 2/1966 Burnett ........................ 188/206X
 3,378,113 4/1968 Hanley et al. ................ 188/206(A)

Primary Examiner—Duane A. Reger
Attorneys—Cecil F. Arens and Plante, Arens, Hartz, Hix and Smith ABSTRACT: This invention relates to a brake-backing plate which is comprised of an inner member and an outer member. The inner member, which is oblong in shape and includes an integral anchor boss, is rigidly secured to said outer member which is comprised of allochiral portions.

PATENTED APR 27 1971
3,576,237
SHEET 1 OF 3
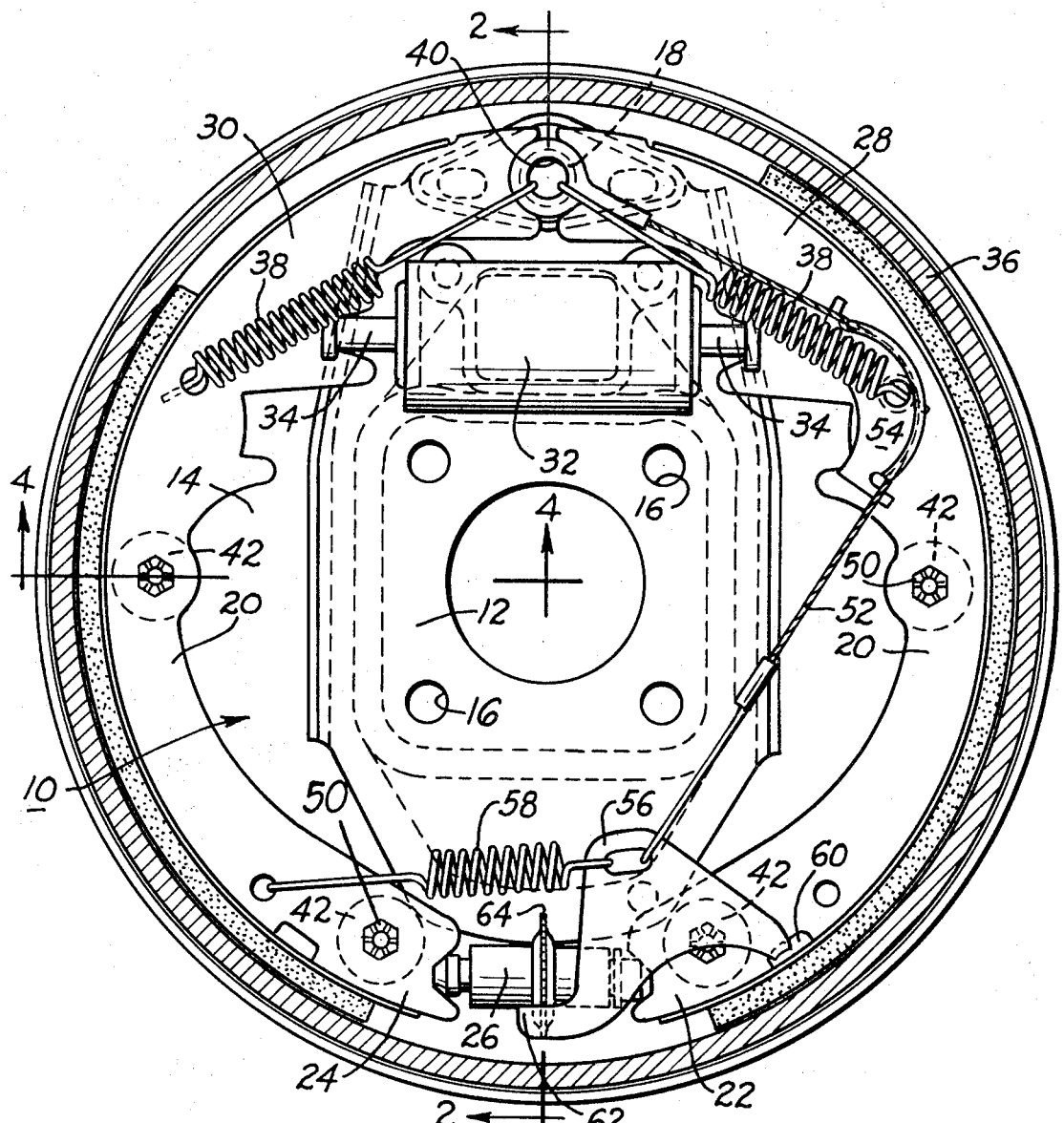
FIG_1
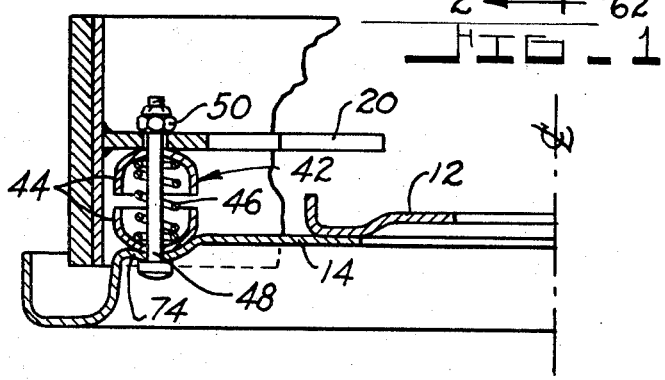
FIG_4
INVENTOR.
ROBERT J. DUBUC.
BY
Plante, Arens, Hartz, Hirt and Smith
ATTORNEYS

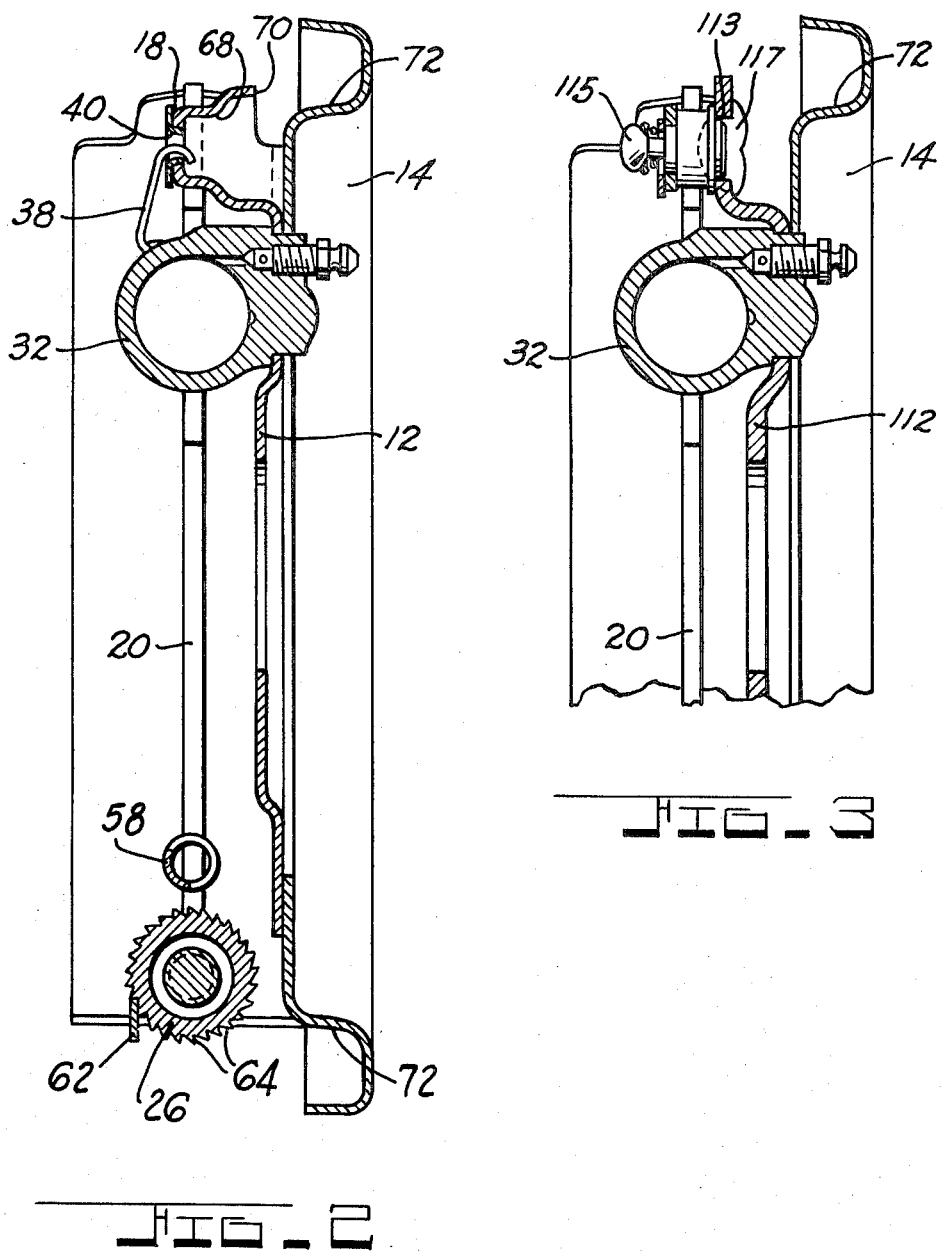

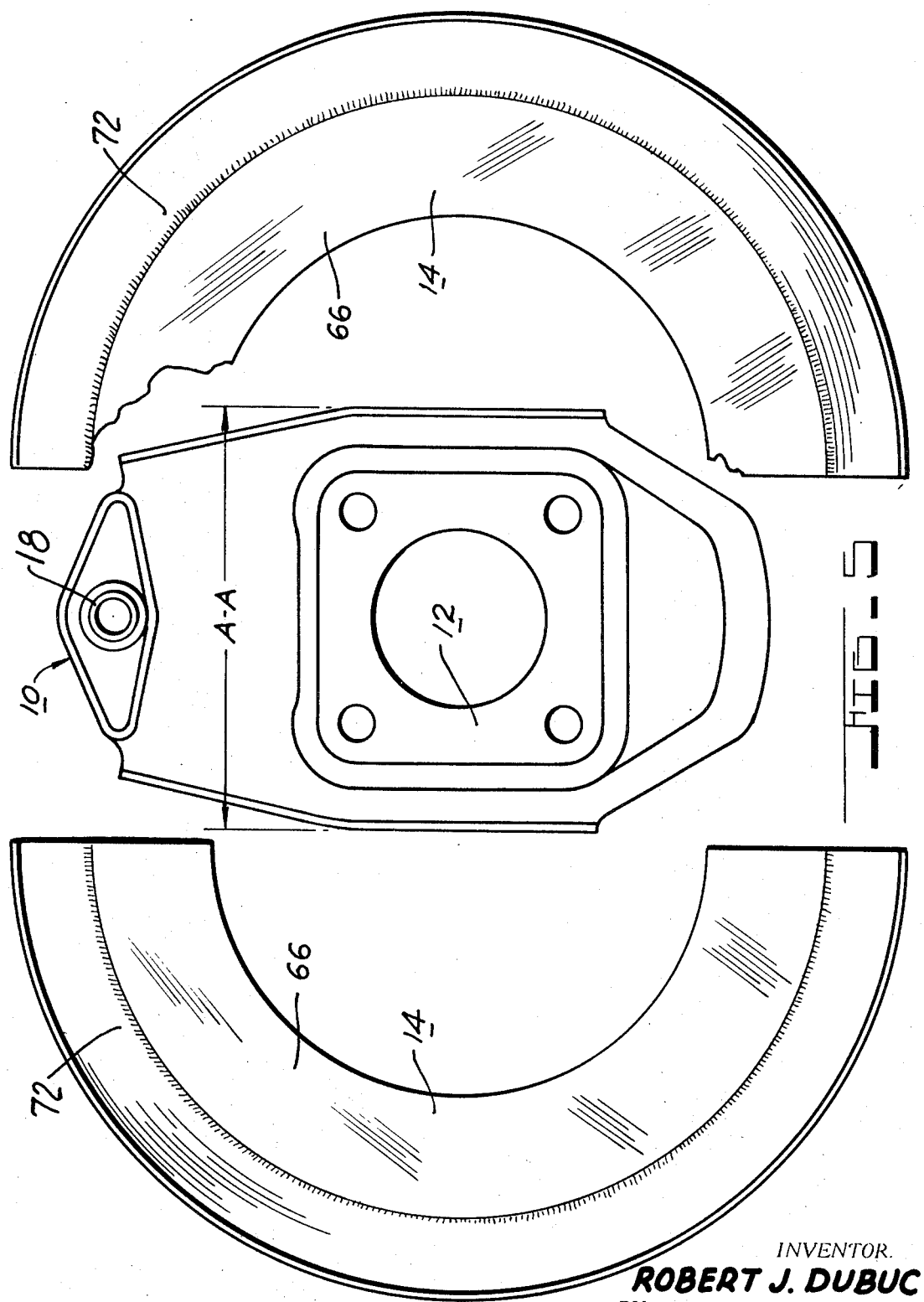

BRAKE BACKING PLATE

BACKGROUND OF THE INVENTION the usual brake assembly most commonly employed on present day vehicles includes a backing plate with an opening to receive the shoe anchor pin and a shoe guide plate or other retention structure. The anchor pin is inserted through a hole in the backing plate and a riveted head is formed on the anchor pin on the backside of the backing plate. Frequently, a reinforcement plate must be welded to the shoe side of the backing plate to insure structural strength of the backing plate. Moreover, the shoe guide plate is normally welded by a separate operation to the backing plate. These parts and the method of securing the anchor pin, the shoe guide plate and the anchor reinforcing plate to the backing plate are unduly costly when compared to the total cost of a brake assembly. Further, the scrap material resulting from the stamping operation used to manufacture the backing plate is substantial. Thus, a sizeable brake assembly cost savings could result from techniques designed to minimize scrap material from the backing plate stamping operation.

SUMMARY OF THE INVENTION

It is an object of this invention to provide a brake assembly which will be less expensive to manufacture and still be an improvement over the commonly used brake assemblies of this general type.

It is an object of this invention to provide an improved backing plate having portions for support of the brakeshoes.

It is an object of this invention to provide an improved backing plate having an integral projection serving as an anchor for the brakeshoes.

It is an object of this invention to provide an improved backing plate being comprised of a plurality of pieces.

The above and other objects and features of the invention will appear more fully hereinafter from a consideration of the following description, taken in connection with the accompanying drawings wherein the embodiment of the invention shown therein are illustrated by way of example.

BRIEF DESCRIPTION OF THE DRAWINGS

FIG. 1 is a front view of a brake assembly of the present invention;

FIG. 2 is a section view taken on line 2-2 of FIG. 1;

FIG. 3 is a modified form of the anchor pin shown in FIG. 2;

FIG. 4 is a section view taken on line 4-4 of FIG. 1; and

FIG. 5 is an exploded front view of the backing plate of this invention.

DESCRIPTION OF THE PREFERRED EMBODIMENT

With reference now to the drawings, and specifically FIG. 1, the brake assembly shown comprises a brake-backing plate 10 having an inner member 12 and an outer member 14, with said inner member 12 having holes 16 for receiving bolts to mount the backing plate on an appropriate part of a vehicle such, for example, as the axle flange, not shown. The backing plate has an anchor pin or boss 18 formed integrally therewith and while illustrated as round, may be in any shape such as, for instance, oval, elliptical or square. Brakeshoes 20 are slidably mounted on the backing plate 10 and have their ends 22 and 24 interconnected by an adjusting strut 26. The opposite shoe ends 28 and 30 are spread apart by fluid motor 32 which is rigidly secured to the backing plate 10. The fluid motor includes a pair of oppositely acting pistons, not shown, operatively connected to the two ends 28 and 30 through force transmitting links 34. Actuation of the pistons applies a force to each of the links tending to move the brakeshoes 20 toward a rotatable drum 36 which may be secured to a wheel, not shown. Springs 38 have one end hooked into opening 40 of said anchor boss 18 and the other end connected to the respective brakeshoes 20 to urge them into contact with said anchor boss 18 when the fluid motor 32 is not pressurized.

The above arrangement also has a means 42 for supporting said brakeshoes 20. As may be seen best in FIG. 4, said means 42 comprises cap members 44, spring 46, bolt 48 and nut 50. The structure shown also has an automatic adjusting mechanism comprising a cable 52, cable guide 54, lever 56, and spring 58. The cable 52 is attached at one end to the anchor boss 18 and has its other end connected to lever 56. The spring 58 has one end connected to the brakeshoe and its other end connected to the lever 56. The lever 56 is pivotally connected to the other brakeshoe at slot 60 and has a portion 62 engaging a toothed wheel 64, which in turn, is part of the conventional adjusting strut 26.

With reference to FIG. 5, the construction of the backing plate 10 can be seen in greater detail. The backing plate 10, as aforementioned, is comprised of an inner member 12 and an outer member 14. The outer member 14 is comprised of two allochiral portions 66, that is, two portions which are a mirror image of each other. As may be seen from the drawing, the width A-A of the inner member 12, taken along its minor axis, is approximately one-half the width of said outer member 14. Thus, the three elements comprising the backing plate 10 may be stamped out of a flat sheet of metal which is approximately one-half the width of raw material normally used for brake-backing plate construction. This use of narrow steel rolls will substantially reduce the difficulty in handling of material during the manufacturing process. Further, as may be best seen in FIGS. 2 and 5, the forming by stamping of the anchor pin or boss 18 is greatly simplified when compared to the conventional one-piece brake-backing plate. Specifically, the annular bend 68, made during the stamping of the inner member 12 to form said boss 18, is easily held during the operation by a flange of material, that is subsequently removed from surface 70 as scrap material. Further, the outer member 14 has formed therein by a similar relatively simple stamping operation, the annular groove 72 to assist in excluding contaminants from the interior of the brake assembly. In contrast, the conventional backing plate, being of one-piece construction, would necessitate the forming of annular bend 68 and the annular groove 72 from the same piece during the same stamping operation. Thus, more flange material is required to hold the backing plate during the stamping. Additionally, the material around the boss 18 is being moved in one direction while the material of the groove 72 is being moved in the other, thereby creating very high stresses and forces which inherently result in an unusually high part scrap rate. Therefore, the three-piece backing plate disclosed in this invention, measurably reduces the scrap rate of material and piece parts associated with manufacture of the brake assembly. As may again be seen from the drawings, the inner member 12 may be fabricated from the gage of material conventionally used for backing plate applications, whereas the outer member 14 may be manufactured from a thinner gage of metal, since braking torque resulting from engagement of said brakeshoes 20 with said rotatable drum 36 is carried almost exclusively by said inner member 12. The outer member 14 functions primarily, then, as a dust shield and in cooperation with said means 42 to support the brakeshoes 20 to maintain them at a predetermined distance from said backing plate.

Referring briefly to FIG. 4, it may be seen that the outer member 14 has shoe-supporting portions 74 which slidably cooperate with said means 42 for supporting said brakeshoes 20. A detailed description of said means 42 is provided in copending U.S. Pat. application Ser. No. 793,955 filed Jan. 27, 1969.

The assembly of said allochiral portions 66 and said inner member 12 to form the backing plate 10 may obviously be performed by welding them together or employing one of the numerous other conventional fastening techniques.

Referring back now to FIG. 3, therein is illustrated a modified form of said brake-backing plate 10. A modified inner member 112 has an opening 113 which receives a conventional anchor pin 115. A riveted head 117 is then formed on the anchor pin 115 on the backside of the backing plate to secure the pin in place. As will be seen by those skilled in the art, the anchor pin 115 may assume the necessary form to function in cooperation with the ends of the brakeshoes and the return springs.

For a more extensive explanation of the operation of said automatic adjusting mechanism, hereinabove described, reference is made to copending U.S. Pat. Application Ser. No. 792,903, filed Jan. 15, 1969.

While the specific details have been herein shown and described, the invention is not confined thereto, as other substitutions can be made within the spirit and scope of the invention.

I claim:
1. A drum brake assembly comprising:
   a backing plate including an oblong-shaped inner member having a major and minor axis and an outer member rigidly interconnected;
   said inner member including an anchor boss;
   a pair of brakeshoes arranged in end-to-end relationship on said inner member and having one pair of adjacent ends abutting said anchor boss;
   said outer member including shoe-supporting portions for engagement with means for supporting said shoes.
2. An inner member as recited in claim 1, wherein the width of said inner member taken along it minor axis is approximately one-half of the width of said outer member.
3. A drum brake assembly comprising:
   a backing plate including an inner member and an outer member rigidly interconnected;
   said inner member including an anchor boss;
   said outer member being comprised of at least two allochiral portions;
   a pair of brakeshoes arranged in end-to-end relationship on said inner member and having one pair of adjacent ends abutting said anchor boss;
   said outer member including shoe-supporting portions for engagement with means for supporting said shoes.